(12) United States Patent
Gutierrez et al.

(10) Patent No.: US 7,098,299 B1
(45) Date of Patent: Aug. 29, 2006

(54) SEPARATION OF CONTAMINANTS FROM POLYESTER MATERIALS

(75) Inventors: Carlos Gutierrez, Spartanburg, SC (US); Alfred Gerald Fishbeck, Georgetown, SC (US)

(73) Assignee: United Resource Recovery Corporation, Spartanburg, SC (US)

(*) Notice: Subject to any disclaimer, the term of this patent is extended or adjusted under 35 U.S.C. 154(b) by 0 days.

(21) Appl. No.: 11/081,789

(22) Filed: Mar. 16, 2005

(51) Int. Cl.
   *C08F 6/00* (2006.01)
(52) U.S. Cl. ............... 528/488; 521/46.5; 528/489; 562/485; 562/487
(58) Field of Classification Search ............ 521/46.5; 528/488, 489; 562/485, 487
   See application file for complete search history.

(56) References Cited

U.S. PATENT DOCUMENTS

| | | |
|---|---|---|
| 2,927,130 A | 3/1960 | Schütt |
| 3,047,435 A | 7/1962 | Wemple |
| 3,120,561 A | 2/1964 | Chambert |
| 3,215,735 A | 11/1965 | Sakuri et al. |
| 3,257,335 A | 6/1966 | Whitfield, Jr. et al. |
| 3,400,187 A | 9/1968 | Farrow |
| 3,503,904 A | 3/1970 | Dietz et al. |
| 3,544,622 A | 12/1970 | England |
| 3,579,572 A | 5/1971 | Amedjian et al. |
| 3,594,414 A | 7/1971 | Katzschmann |
| 3,647,422 A | 3/1972 | Wainer |
| 3,652,466 A | 3/1972 | Hittel et al. |
| 3,873,314 A | 3/1975 | Woo et al. |
| 3,873,609 A | 3/1975 | Wu et al. |
| 3,884,850 A | 5/1975 | Ostrowski |
| 3,928,188 A | 12/1975 | Link et al. |
| 3,928,253 A | 12/1975 | Thornton et al. |
| 3,952,053 A | 4/1976 | Brown, Jr. et al. |
| 3,953,502 A | 4/1976 | Bowler et al. |
| 3,956,088 A | 5/1976 | Fassell et al. |
| 3,960,817 A | 6/1976 | Morawetz et al. |
| 4,033,907 A | 7/1977 | Wolf |
| 4,078,143 A | 3/1978 | Malik et al. |
| 4,161,578 A | 7/1979 | Herron |
| 4,163,860 A | 8/1979 | Delattre et al. |
| 4,189,242 A | 2/1980 | Lüke |
| 4,201,871 A | 5/1980 | Tanouchi et al. |
| 4,212,774 A | 7/1980 | Idel |
| 4,250,331 A | 2/1981 | Shimsick |
| 4,320,979 A | 3/1982 | Lucke |
| 4,324,705 A | 4/1982 | Seto et al. |
| 4,345,098 A | 8/1982 | Schep |
| 4,355,175 A | 10/1982 | Pusztaszeri |
| 4,368,274 A | 1/1983 | Scott |
| 4,389,020 A | 6/1983 | Clin et al. |
| 4,392,889 A | 7/1983 | Grout |
| 4,532,319 A | 7/1985 | Wendling |
| 4,542,239 A | 9/1985 | Lamparter et al. |
| 4,570,861 A | 2/1986 | Zentgraf et al. |
| 4,578,502 A | 3/1986 | Cudmore |
| 4,578,510 A | 3/1986 | Doerr |
| 4,602,046 A | 7/1986 | Buser et al. |
| 4,605,762 A | 8/1986 | Mandoki |
| 4,612,057 A | 9/1986 | Buser et al. |
| 4,617,111 A | 10/1986 | Grimm et al. |
| 4,620,032 A | 10/1986 | Doerr |
| 4,626,598 A | 12/1986 | Packer et al. |
| 4,629,780 A * | 12/1986 | Schoenhard ............... 528/488 |
| 4,803,256 A | 2/1989 | Luckenbach |
| 5,064,466 A | 11/1991 | Hilton |
| 5,095,145 A | 3/1992 | Rosen |
| 5,120,768 A | 6/1992 | Sisson |
| 5,234,110 A | 8/1993 | Kobler |
| 5,248,041 A | 9/1993 | Deiringer |
| 5,254,666 A | 10/1993 | Benzaria |
| 5,286,463 A | 2/1994 | Schwartz, Jr. |
| 5,328,982 A | 7/1994 | Tindall et al. |
| 5,344,025 A | 9/1994 | Tyler et al. |
| 5,366,091 A | 11/1994 | Stahl et al. |
| 5,366,998 A | 11/1994 | Schwartz, Jr. |
| 5,395,858 A | 3/1995 | Schwartz, Jr. |
| 5,458,246 A | 10/1995 | Thom, Jr. |
| 5,532,335 A | 7/1996 | Kimball et al. |
| 5,555,984 A | 9/1996 | Sommer, Jr. et al. |
| 5,580,905 A | 12/1996 | Schwartz, Jr. |
| 5,590,479 A | 1/1997 | Ruf et al. |
| 5,597,852 A | 1/1997 | Unger et al. |

(Continued)

FOREIGN PATENT DOCUMENTS

DE   10032899 A1   1/2002

(Continued)

OTHER PUBLICATIONS

PCT Search Report and Written Opinion for PCT/US05/08668, Jul. 6, 2005.

*Primary Examiner*—Terressa Boykin
(74) *Attorney, Agent, or Firm*—Dority & Manning, P.A.

(57) ABSTRACT

The present invention is generally directed to a process for separating and recovering post-consumer polyester from various contaminant materials. The invention can be utilized to separate post-consumer polyester from various contaminants including glass, dirt, paper, metal, glue, dye, and the like. The disclosed process includes several stages including a preparation stage, in which a portion of the contaminants can be removed from the polyester, as well as a reaction stage, in which a portion of the polyester can be saponified and contaminants can be physically separated from the polyester. In addition, during the reaction stage, certain hard-to-separate contaminants, such as aluminum and polyvinyl chloride, can react to a form more easily separable from the polyester.

14 Claims, 2 Drawing Sheets

U.S. PATENT DOCUMENTS

| | | |
|---|---|---|
| 5,610,516 A | 3/1997 | Maier |
| 5,958,987 A | 9/1999 | Schwartz, Jr. et al. |
| 6,147,129 A * | 11/2000 | Schwartz, Jr. ............. 521/48.5 |
| 6,197,838 B1 | 3/2001 | Schwartz, Jr. et al. |
| 6,270,025 B1 | 8/2001 | Geigle et al. |
| 6,299,789 B1 * | 10/2001 | Tatemoto et al. .......... 252/8.84 |
| 6,460,788 B1 | 10/2002 | de Feraudy |
| 6,629,653 B1 | 10/2003 | Fahrbach et al. |
| 2003/0010680 A1* | 1/2003 | Holmes et al. .......... 209/172.5 |
| 2003/0183705 A1 | 10/2003 | Christiani et al. |
| 2003/0186159 A1 | 10/2003 | Schwartz, Jr. |
| 2005/0054740 A1 | 3/2005 | Gutierrez et al. |

FOREIGN PATENT DOCUMENTS

| | | |
|---|---|---|
| EP | 0497662 A1 | 8/1992 |
| EP | 0550979 A2 | 7/1993 |
| GB | 610135 | 10/1948 |
| WO | WO 02102884 A1 | 12/2002 |
| WO | WO 02102884 A1 | 12/2002 |

* cited by examiner

SEPARATION OF CONTAMINANTS FROM POLYESTER MATERIALS

BACKGROUND OF THE INVENTION

Polyesters are polymeric materials made from the esterification of polybasic organic acids with polyhydric acids. Perhaps the most commonly made and used polyester is polyethylene terephthalate (PET), which can be manufactured by reacting terephthalic acid with ethylene glycol.

Polyesters are currently being used in increasing amounts in various applications. For instance, polyesters are commonly used to make many types of beverage and food containers, photographic films, X-ray films, magnetic recording tapes, electrical insulation, surgical aids such as synthetic arteries, fabrics and other textile products.

Because polyesters can be remelted and reformed, ongoing efforts are underway to efficiently recycle as much polyester as possible after use. Before polyester can be recycled, however, it is necessary to separate the post-consumer polyester from contaminants, i.e., materials that may be found mixed with or attached to the polyester. For instance, contaminants can be loose and mixed with the polyester materials, can be attached to the surface of the polyester materials, as with labels attached to the surface of the materials, or can be within the polyester materials, as in the case of embedded or entrained materials.

What is needed in the art are improved methods for removing contaminants from polyester materials, and in particular, from post-consumer polyester materials.

SUMMARY OF THE INVENTION

In general, the disclosed invention is directed to methods for separating contaminants from polyester. In particular, the disclosed process can separate polyester from contaminants that are embedded or entrained in the polyester, contaminants that are attached to the surface of the polyester, and/or contaminants that are merely mixed with the polyester.

The method can be described as a multi-stage process including a preparation stage and a reaction stage. If desired, the preparation stage can include an operation for chopping the polyester and forming a mixture including polyester and contaminants. For instance, in one embodiment, the polyester can be chopped to a flake size of less than about 15 mm.

The preparation stage can include various operations for physically removing a portion of the contaminants from the polyester mixture including, for instance one or more elutriation processes, in which various loose contaminants, including contaminants such as metals and paper, can be removed from the mixture or a dry-cleaning operation, in which contaminants can be removed from the substantially dry mixture by fluidizing the dry mixture and spinning the dry mixture about the axis of the cleaning chamber such that a portion of the mixture collides with a mesh wall as the mixture spins about the axis, and passing a portion of the contaminants through the mesh. Another dry separation process that can be included in the preparation stage is a color-sorting process. A color sorting process during the preparation stage can remove various contaminants including, for example, metals and colored PET, such as $TiO_2$-containing PET.

In one embodiment, the mixture can be subjected to a high quality metal detection and removal operation. According to this particular embodiment, multiple metal detectors can be placed in series and/or parallel combination to form banks of metal detectors. The mixture can then be fed through one or more banks of metal detectors for the removal of metal contaminants. At each metal detector in the bank, the stream can be split into accepted materials (those that pass on to the next step in the process) and rejected materials (those containing metal). In one embodiment, materials can be recycled back through the metal removal operation. In those embodiments wherein two or more individual metal detectors are arranged in a series combination, the sensitivity of the metal detectors in series can be increased with progression of the series. A high quality metal detection and removal operation can not only increase the amount of metal removed from the product stream as compared to previously known processes, but can also, with the addition of the recycle stream, reduce the amount of polyester that can be lost from the stream during the separation process.

In addition to the separation operations generally carried out when the mixture is dry, the preparation stage of the process can include one or more aqueous separation operations. For example, one or more aqueous separation operations such as high intensity washing operations and sink/float operations can be utilized. In one embodiment, the process can be further improved by recirculating the water used in the aqueous separation operations through a recirculation tank.

Following the preparation stage, the mixture can be processed according to a reaction stage that can include a high energy mixing operation as well as a heat setting operation. During the high energy mixing operation, a slurry including the polyester/contaminant mixture and an alkaline composition can be formed within or optionally prior to being fed into a high-energy mixer. For example, the alkaline composition can include sodium hydroxide, calcium hydroxide, magnesium hydroxide, potassium hydroxide, lithium hydroxide, or mixtures thereof. The amount of alkaline composition added to the slurry can include an amount of alkaline so as to react with less than all of the polyester. For example, the alkaline composition that can be combined with the mixture in one embodiment can be an amount sufficient to react with less than about 20% by weight of the polyester.

If desired, the slurry can be formed in a more conventional mixer prior to being fed to the high-energy mixer for reaction. For example, the alkaline composition and the dry polyester mixture can first be combined in a low-energy mixer prior to being fed to the high-energy mixer. During the low-energy mixing, the polyester flakes contained in the slurry can be coated with the alkaline composition. In addition, in one embodiment, the energy input to the slurry while contained in the low-energy mixer can be controlled such that the alkaline composition can react with certain impurities that may be included in the polyester mixture. For example, the low-energy mixer can be maintained so as to promote the reaction of aluminum contaminants with the alkaline composition while the slurry is in the low-energy mixer.

The high-energy mixer used can be a mixer in which sufficient energy can be imparted to the slurry from the mixing action itself so as to promote a saponification reaction between a portion of the polyester and the alkaline composition. In particular, during the high energy mixing operation any heat added to the high-energy mixer will not independently provide sufficient energy to promote the saponification reaction.

Following the high energy mixing operation, the mixture can be further processed, for example, in those embodiments wherein food-grade polyester materials are desired for the polyester product of the process. In one embodiment, following saponification in the high-energy mixer, the slurry can be heated to a temperature that is not greater than the melting point of the polyester. In particular, the mixture can be heated in an environment including less than about 80 ppm water content. Optionally, the mixture can be heated in an oxygen-starved environment. This is not a requirement of the invention, however, and in other embodiments, the mixture can be heating in an oxygen-rich environment.

If desired, the mixture can be pre-heated prior to the heating step, for instance to dry the mixture. According to this embodiment, the mixture can be pre-heated to a temperature less than about 160° C.

The method can also include operations for recovery of various by-products produced during the separation and/or reaction operations. For example, in one embodiment, ethylene glycol can be produced in the saponification reaction. If desired, the ethylene glycol can be recovered following the saponification reaction. Another by-product of the process that can be produced and recovered, if desired, is the terephthalic salt that can also be produced in the saponification reaction.

The method can beneficially be utilized to remove many hard-to-separate contaminants from polyester. For instance, in one embodiment in which the contaminants include polyvinyl chloride, a portion of the alkaline composition can react with the polyvinyl chloride, causing the polyvinyl chloride to become dechlorinated during the reaction.

Another contaminant that has proven difficult to separate from post-consumer polyester in the past has been aluminum. According to one embodiment of the present invention, aluminum mixed with the polyester can react with a portion of the alkaline composition and be removed from the mixture, for instance as an aluminum salt or as the brittle aluminum remains of the reaction.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures including.

DETAILED DESCRIPTION OF PREFERRED EMBODIMENTS

Figure 1:
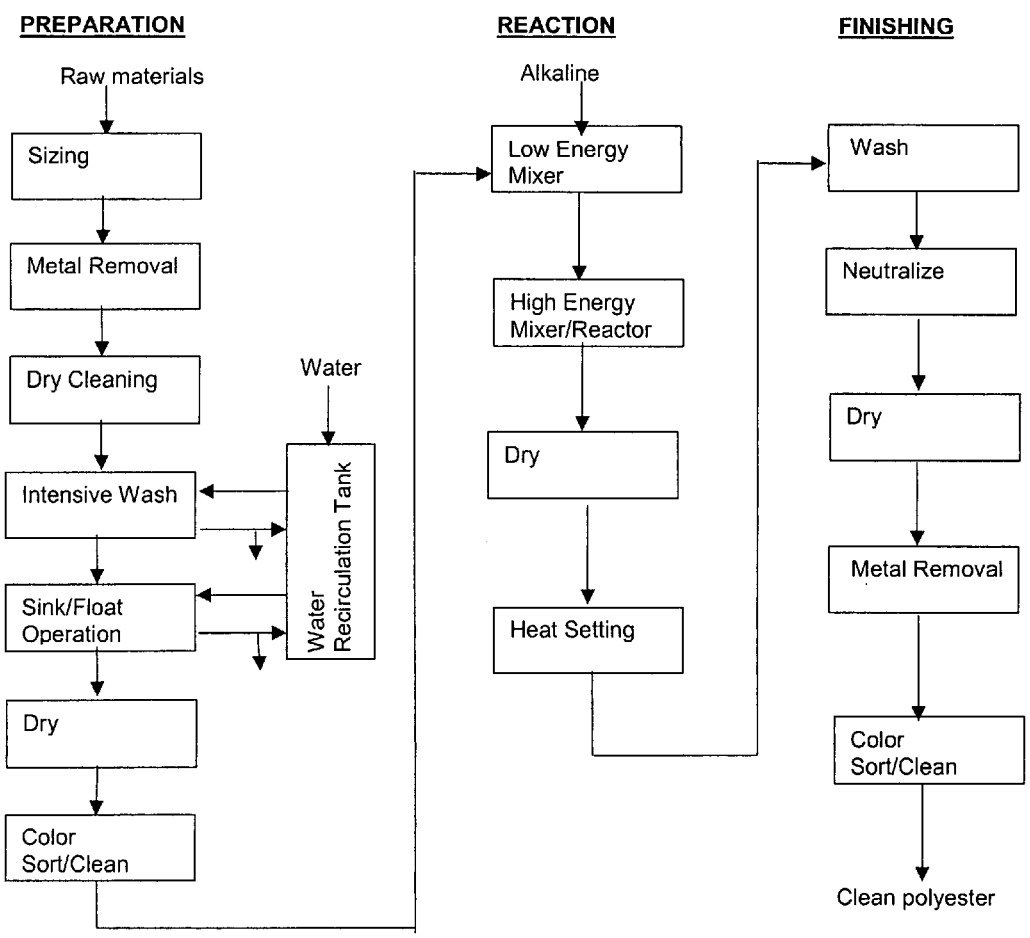
FIG. 1 illustrating a flow diagram of one embodiment of a polyester recycling process according to the present invention.

Reference will now be made in detail to various embodiments of the invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

The present invention is generally directed to a process for separating and recovering post-consumer polyester from various contaminant materials. The invention can be utilized to separate post-consumer polyester from various contaminants including glass, dirt, paper, metal, glue, dye, and the like. Beneficially, the disclosed process includes multiple stages, including a preparation stage, in which the a portion of the contaminants can be removed from a mixture containing contaminants and polyester, as well as a reaction stage, in which a portion of the polyester can be saponified thus allowing additional contaminants to be separated from the polyester. In particular, during the reaction stage of the process, contaminants that are physically attached to or within the polyester can become detached, so as to be more easily removed from the mixture in separation steps. In addition, during the reaction stage of the process, certain hard-to-separate contaminants, such as aluminum and/or polyvinyl chloride (PVC) can react to a form more easily separable from the polyester. In certain embodiments, the disclosed process can significantly reduce the total production of wastewater as well as the level of contamination of wastewater in a polyester recycling process.

In general, a polyester is defined as an esterification or reaction product between a polybasic organic acid and a polyol. It is believed that any known polyester or copolyester may be used in the process of the present invention. However, in one particular embodiment, the process of the present invention is directed to a class of polyesters referred to herein as polyol polyterephthalates, in which terephthalic acid serves as the polybasic organic acid.

As used herein, a polybasic organic acid refers to any organic acid having two or more carboxyl groups (—COOH). Most polyesters are derived from dibasic acids, also referred to as dicarboxylic acids. Polybasic acids can have a linear or a cyclic conformation. Examples of linear polybasic acids that can be used to make polyesters include the aliphatic dicarboxylic acids. In particular, the aliphatic dicarboxylic acids having up to ten carbon atoms in their chains can be used. These acids include adipic acid, glutaric acid, succinic acid, malonic acid, oxalic acid, pimelic acid, suberic acid, azelaic acid, sebacic acid, maleic acid, and fumaric acid.

Cyclic polybasic organic acids, on the other hand, include the carbocyclic dicarboxylic acids. These acids include phthalic acid, isophthalic acid, and terephthalic acid. In particular, terephthalic acid is used to make polyethylene terephthalate, which is perhaps the most common commercially available polyester.

As described above, a polybasic organic acid can be reacted with a polyol to produce a polyester. Polyols are compounds that contain at least two hydroxyl groups. Many polyesters are synthesized with a diol. Diols are normally prepared from an alkene by the net addition of two hydroxy groups to the double carbon bond in a method known as hydroxylation. Polyols are commonly referred to as glycols and polyhydric alcohols. Examples of polyols used to make polyesters include ethylene glycol, propylene glycol, butylene glycol, and cyclohexane dimethanol.

For exemplary purposes, Table 1 contains a nonexhaustive list of commercially available polyesters that may be recovered and recycled according to the present invention. For each polyester, the corresponding polybasic organic acid and polyol are provided.

TABLE 1

| POLYESTER | POLYBASIC ORGANIC ACID | DIOL |
| --- | --- | --- |
| Polyethylene Terephthalate | Terephthalic Acid | Ethylene Glycol |

TABLE 1-continued

| POLYESTER | POLYBASIC ORGANIC ACID | DIOL |
|---|---|---|
| Polybutylene Terephthalate | Terephthalic Acid | Butylene Glycol |
| PETG Co-polyester | Terephthalic Acid | Cyclohexane-dimethanol And Ethylene Glycol |
| PBTG Co-polyester | Terephthalic Acid | Cyclohexane-dimethanol And Butylene Glycol |
| Polycyclohexane-dimethanol Terephthalate | Terephthalic Acid | Cyclohexane-dimethanol |
| PEN Polyester | Naphthalene Dicarboxylic Acid | Ethylene Glycol |

In one particular embodiment of the disclosed invention, the polyester being recovered can be polyethylene terephthalate (PET). Accordingly, much of this discussion is directed to PET, though this should not be considered as limiting the invention in any way to the recovery and decontamination of PET.

In one embodiment, the process of the present invention can be considered as a three-stage operation for removing contaminants from polyester and can include a preparation stage, a reaction stage, and a finishing stage. In addition, each stage of the overall process can include one or more individual operations. In one embodiment, the preparation stage can include at least one dry separation operation and at least one aqueous separation operation, during which contaminants can be removed from the polyester-containing mixture. Following the preparation stage can be a reaction stage in which the mixture containing polyester and contaminants can be combined with an alkaline composition. The alkaline can react with a portion of the polyester in a saponification reaction as well as reacting with various possible contaminants in the mixture so as to degrade or otherwise chemically convert the contaminants to a form more easily separable from polyester. This stage of the process can also include the separation and removal of contaminants from the mixture, if desired. The reaction stage can also include various heat setting reactions that can, among other benefits, further purify the polyester substrate and improve the physical characteristics of the product material. The final finishing stage of the process can include operations to improve the quality of the product through, for example, washing and sorting of the product as well as additional separation operations.

The process of the present invention can run continuously or can be set up as a batch system. In addition, any particular operation of the process can be run as a continuous or batch system. Practically any material containing a polyester can be processed according to the invention. In one preferred embodiment, the polyester materials can be recovered from the solid waste stream, thus alleviating many environmental concerns and disposal problems. In one particular embodiment, the process can be directed to recovery and recycling of food and/or beverage containers made from PET. Through the process of the present invention, polyesters can be separated, recovered and reused from post-consumer waste, even when the polyesters are found mixed with certain hard-to-separate materials, such as polyvinyl chloride or aluminum, adhered to various coatings, or entrained with either various materials, such as organic and/or inorganic compounds. Unfortunately, many post-consumer polyesters are currently being disposed of in landfills or are being incinerated after use due to a lack of an economical process that can be used to separate and recover the polyester.

Included among the contaminants that can be adhered to or contained within the feed polyester materials that the disclosed process can beneficially remove are various barrier materials. Barrier materials removable according to the present invention can include barrier coatings that can be, for example, applied to beverage containers in order to prevent carbon dioxide and/or oxygen flow across the substrate. Other barrier materials that can be removed according to the present process can include certain chemical barrier material additives, for example chemical scavenger materials added to the polyester materials during initial formation, and/or the breakdown products formed upon reaction of such additives. In one embodiment, the disclosed process can be utilized to remove barrier materials applied as coatings for location between layers on multi-layer bottles.

In addition to coated barrier materials, the process can remove other coatings from the polyester materials as well. For instance, the process can remove applied labels, including paper and/or polymeric labels, screen-printed labels, and the like. The term "screen printed labels" generally refers to inks that have been directly applied to polyester containers, such as beverage containers. For instance, many soft drink containers are typically labeled with an epoxy-based ink. In the past, many problems have been encountered in attempting to separate polyester from these types of coatings and inks.

A non-limiting exemplary list of barrier materials (both coatings and chemical constituents contained throughout the polyester substrate) and non-barrier coatings materials that can be removed from polyester according to the present invention can include, for example, saran, nylon, polyvinylidene chloride, acrylics, epoxy-based polymers, acetaldehyde scavengers, ethyl vinyl alcohol (e.g., EVOH films) and the like.

The process of the present invention is also effective in removing entrained organic and/or inorganic compounds that may have been absorbed by polyester materials. Exemplary compounds can include, for instance, toluene, gasoline, used motor oil, paint, pesticide residues, and other volatile compounds. Such compounds can often be absorbed by polyester upon mere contact. For instance, polyester food and beverage containers are often misused by consumers after the food or beverage has been consumed. Specifically, the containers are sometimes used to hold various organic and/or inorganic compounds and solvents. When attempting to recycle such polyesters, it is necessary to remove substantially all of the absorbed organic and inorganic compounds so that the polyester can be once again reused as a beverage or food container.

Advantageously, regardless of the impurities present, the process of the present invention can include a first preparation stage including removing a portion of the contaminants via one or more physical separation processes followed by a reaction stage involving, in one embodiment, contacting the mixture containing polyester with an alkaline composition, mixing the alkaline composition and the polyester containing mixture together such that the solids of the mixture are substantially and evenly coated by the composition and partial saponification of the polyester occurs, heating the materials in a one or multi-step process to a temperature sufficient to complete the saponification reaction, if necessary, as well as to, among other possible benefits, preserve and/or enhance the physical properties of the polyester, and then purifying the polyester-containing mixture through various possible separation operations including, for example, washing the materials with a fluid, such as water.

A recovery process according to one embodiment of the invention will now be described in terms of one preferred example thereof which is set forth in FIG. 1. As illustrated in FIG. 1, the disclosed process can be conveniently referenced by delineation of the process into three stages, i.e., a preparation stage, a reaction stage, and a finishing stage. It should be understood, however, that this particular delineation is for convenience in describing this embodiment, and is not to be considered a requirement of the disclosed process.

Preparation Stage

Prior to being separated from contaminants according to the present invention, the contaminated polyester materials can be, if desired, chopped or ground into flake form, for instance in a sizing operation. For purposes of this disclosure, the term polyester flake refers to polyester materials that have been chopped or ground into smaller pieces. Flaking of the materials can be done for the purpose of facilitating handling. It should be understood that all different sizes and shapes of material may be used in the process of the present invention and no one size or shape is required. For instance, in one embodiment, the polyester can be in a discrete form, e.g., finely divided or pelletized. Examples of post-sizing piece size can include, for example, pieces having a size of between about 1 and about 15 mm. In one embodiment, the pieces can have a size of between about 0.125 and about 0.75 in. The precise form of the pieces is not critical to the present invention.

In one particular embodiment, the polyester can be ground or chopped while the mixture containing the polyester is dry. While not wishing to be bound by any particular theory, it is believed that chopping the materials while in a dry state can improve the separation of certain contaminants from the polyester substrates. For example, it is believed that when multi-layered bottles are treated according to the disclosed process, dry grinding can facilitate the separation of the layers and the removal of the coating material located between layers of polyester in the multi-layered bottles.

Following any chopping or flaking of the polyester substrate, the dry mixture containing polyester and contaminants can be subjected to one or more operations for the removal of contaminants heavier than the polyester. For example, according to one embodiment, the mixture can be subjected to an elutriation process specifically designed for the removal of heavy contaminants, and in particular, metal contaminants. Elutriation is simply a process for separating heavier materials from lighter materials by use of a directed stream of fluid flow (i.e., gas or liquid). Elutriation has been used in many processes including recycling processes in the past to remove lighter contaminants from polyester. For example, elutriation operations are known throughout recycling processes for removing lighter label materials, such as paper, for example, from a mixture. In addition, elutriation operations can be used at various beneficial points throughout the process of the present invention for the removal of fines from the mixture.

According to one embodiment of the present invention, following any desired chopping or grinding of the materials, an elutriation process can be utilized to remove contaminants from the mixture that are heavier than the polyester materials being recovered. More specifically, whereas in the past, it has been known to pull lighter contaminants off of the polyester mixture via an elutriation process, according to this particular embodiment of the present invention, the mixture containing the polyester can be the lighter stream separated during the elutriation operation, and heavier contaminants, such as metal, rock, dirt, and the like, can be removed from the mixture in the heavy stream pulled off of the elutriator. According to this particular separation operation, the elutriation fluid flow rate can be higher than that used in previously known processes for separating lighter materials from a polyester-containing stream in order to separate heavier contaminants the from the polyester-containing mixture. For example, in one embodiment, a fluid stream (e.g., air) flow rate between about 3600 cubic feet/minute (cfm) and about 4600 cfm can be utilized in an elutriation process with an incoming solids flow of between about 2500 pounds/hour (lb/hr) and about 3500 lb/hr in order to separate the heavier solids from the mixture containing polyester. In one embodiment, the incoming solids flow can be about 3000 lb/hr.

Referring again to FIG. 1, at some point during the preparation stage, for example following an elutriation process for removal of heavy contaminants, the mixture containing contaminants and polyester can be charged to a dry-cleaning vessel. In particular, the mixture of materials charged to the cleaning vessel will contain at least some post-consumer polyester and the mixture will be dry. That is, the mixture will not be in a slurry form. The dry mixture of materials need not be excessively dry, however. For example, the mixture need not be pre-treated to remove all moisture from the mixture, and the mixture can be charged to the vessel at an atmospheric level of humidity.

The dry-cleaning vessel can include a cleaning chamber to which the dry mixture is charged. In one preferred embodiment, this chamber can be at least partially surrounded by a mesh with a predetermined mesh size. It may be preferred in some embodiments that the majority of the individual polyester pieces charged to the dry-cleaning vessel be larger than the openings of the mesh material in the cleaning vessel, to facilitate handling of the mixture. Sizing of the materials prior to charging the materials to the dry-cleaning vessel can also help to insure that at least some contaminants are of a size to pass through the mesh, although many contaminants can be degraded within the dry-cleaning vessel, as described below.

In one embodiment, the chamber can include a series of blades spaced along the axial length of the chamber. After being charged to the vessel, the materials can be induced to revolve or spin about the chamber axis, for instance due to the rotating action of the blades. In particular, the motion of the materials can be enough to fluidize the dry mixture. For example, the blades can rotate at a speed greater than about 20 m/sec, so as to fluidize the charged mixture. In one embodiment, the blades can rotate at greater than about 2000 rpm. In one embodiment, the tip speed of the blades can be between about 40 m/sec and about 100 m/sec, for instance, about 50 m/sec. In another embodiment, the tip speed of the blades can be between about 60 m/sec and about 80 m/sec.

In addition to fluidizing the mixture, the rotation of the mixture caused by the rotating blades can also encourage dynamic collisions between the materials in the mixture and the chamber wall. Collision of materials contained in the mixture with the wall can lead to the degradation of contaminants in the mixture, and in particular, degradation of the contaminants to the point that the individual pieces can be smaller than the mesh size of the surrounding wall. In addition, these dynamic collisions can facilitate physical detachment of embedded or otherwise attached contaminants from the polyester. Upon collision between suitably small contaminants (smaller than the mesh size of the wall) with the mesh, the contaminants can pass through the surrounding mesh, and the polyester can remain in the chamber. The rotation of the blades can also facilitate airflow through the chamber and the movement of the materials from one end of the chamber to the other.

Surprisingly, the dry-cleaning operation can physically separate polyester from attached contaminants, including embedded contaminants, as well as degrade many brittle contaminants, without substantial degradation of the polyester. For example, while coating materials, such as paper label materials or vapor barrier coatings, and embedded materials, such as embedded glass and dirt, can become detached from the polyester substrate during the dry-cleaning operation, the polyester flakes themselves can remain essentially the same size and shape as originally charged to the vessel. In addition, while contaminants can be separated from the polyester and pass through the surrounding mesh, the polyester can remain within the cleaning chamber. Even in those embodiments in which the polyester includes polyester flakes of a size smaller than the mesh openings, the bulk of the small polyester fines can remain suspending in the cleaning chamber and not be lost with the contaminants during the separation process.

While not wishing to be bound by any particular theory, it is believed that due to the centrifugal forces acting on the suspension, the materials within the mixture can separate, with the denser materials, and in particular, contaminants such as glass, metal, paper, and the like, moving to the outside of the mass, while the lighter materials, and particularly the small polyester fines, can remain suspended closer to the center of the chamber. Accordingly, glass-like materials and fibrous materials can degrade and pass through the screen at the outer edge of the mass, while elastomeric materials, such as PET can remain behind. As such, even PET particles smaller than the screen orifice can remain with the main rotating body, and very few polyester fines will pass through the screen, and high yield of polyester can exit the dry-cleaning operation.

The dry-cleaning operation can be particularly effective at removing glass from a mixture including both glass and polyester. Glass has often been considered to be one of the most difficult materials to separate from post-consumer polyester during a polyester recycling process and can be detrimental to the process if not completely removed. Glass that is not removed during the recycling process can not only cause serious damage to processing equipment during the recycling process, but it can also destroy the materials to be formed from the recycled polyester. For example, glass that is not removed during the recycling process can become incorporated with the polyester during a subsequent material formation process (e.g., a beverage container formation process) and can destroy the materials to be formed from the polyester through, for instance, the formation of holes in the polyester products.

According to one embodiment of the present process, more than about 97% of the glass in a mixture containing both glass and polyester can be removed from the mixture during the disclosed dry-cleaning operation. In one embodiment, more than about 98% of the glass in a mixture can be removed. In another embodiment, more than about 99% of the glass can be removed during the dry-cleaning operation.

During the preparation stage, for example either prior to or following the dry-cleaning operation, the mixture can be further processed according to one or more additional dry separation operations. For example, in one embodiment, the mixture can be subjected to an elutriation operation for removing light contaminants from the mixture. For instance, the airflow through the elutriator can be between about 1500 cfm and about 3000 cfm for a solids flow of about 3000 lb/hr and at least a portion of the lighter contaminants can be removed from the mixture. Other dry separation operations that can optionally be included at one or more locations in the preparation stage include any separation operations generally known in the art such as, for instance, screening operations utilizing vibratory screens for separation of contaminants larger or smaller than the polyester, depending upon the mesh size of the screen and the size of the polyester flakes.

During the preparation stage, the mixture can also be subjected to one or more aqueous separation operations. For example, in the embodiment illustrated in FIG. 1, an intensive washing operation can follow the dry-cleaning operation and the elutriation operation. Beneficially, due to the prior separation operation(s), the aqueous separation operations, e.g., the intensive wash operation, that can follow can describe lower contamination levels in the wash water, and hence less wastewater treatment processing can be required by the process. In particular, as many contaminant materials and impurities can be removed by the above described dry separation operations, problems encountered in the past with aqueous separation techniques, such as congealing of separated coating materials, or expensive water treatment requirements, for example, can be less of a problem in the polyester recovery process of the present invention.

For example, following the dry-cleaning operation, with or without any additional separation operations, such as elutriation, for example, the wash water can show a decrease in chemical oxygen demand of at least about 15%, as compared to wash water used directly on the contaminated polyester materials. Similarly, through use of at least the dry-cleaning operation prior to the aqueous wash, the total dissolved solids level of the wash water can decrease by about 30%, total suspended solids can decrease by at least about 50%, and oil and grease can decrease by about 15%.

An intensive washing step can include adding water to the mixture and subjecting the materials contained in the aqueous mixture to high shear so as to facilitate the removal of certain contaminants, such as oligomers, and other organic and inorganic compositions from the surface of the polyester. In general, a high shear wash can include those in which the turbulence of the wash water during the operation is greater than a standard wash, but low enough to prevent excessive flake damage and/or fines formation. For example, a high shear wash according to the present invention can include those in which the wash rotors rotate with a tip speed of between about 500 and about 1000 feet per second (fps). Such high shear washers are commercially available in the art from manufacturers such as Reg-Mac, Sorema, or B&B.

According to another aqueous separation operation suitable for use in the disclosed process, the materials containing the polyester can be immersed in water such that the less dense or lighter materials can be separated from the heavier materials, and specifically from the polyester. More particularly, it is known that polyester sinks in water while other polymers, such as polyolefins, and paper products are water buoyant. Thus, the lighter materials can be easily separated from the heavier materials when contacted with a suitable amount of water. Subjecting the materials to a sink/float separation step and removal from the mixture of some of the contaminants not only can reduce the quantity of materials in the mixture being processed but can also help to clean the materials prior to further processing.

When delivering the mixture containing contaminants and polyester to a sink/float tank, it may be beneficial in certain embodiments to deliver the mixture below the liquid surface. This can eliminate the effect of surface tension of the water in the tank on the materials contained in the mixture, and facilitate the sinking of the denser materials in the tank.

In order to further improve the disclosed process, and in particular, in order to decrease the amount of water used in the process, the preparation stage of the process can also include a recirculation tank for recirculating the water used in, for example, the intensive washer and/or the sink/float tank. Accordingly, any water used in the aqueous operations of the preparation stage, as well as any water removed from the materials during any drying operations at any stage of the process, can be recirculated through the recirculation tank. In addition, the recirculation tank can include an agitator, if desired, so as to maintain in suspension any polyester fines carried over into the recirculation tank, and thus facilitate the reintroduction of these polyester fines back into the main stream of the decontamination process.

Other aqueous separation operations that can optionally be utilized in the preparation stage of the process can include, for example, utilization of one or more hydrocyclone separators as are generally known in the art. For example, a single hydrocyclone, double hydrocyclones, or multiple hydrocyclones can be utilized in series for separating contaminants from the mixture containing polyester.

Following the aqueous preparation operations, e.g., the intensive wash and the sink/float separation step, the mixture containing polyester and remaining contaminants can be dried and optionally subjected to additional dry separation operations prior to being combined with an alkaline material during the reaction stage of the process. This drying operation can, for example, occur at temperatures not greater than about 160° C. For instance, in one embodiment, drying can occur at between about 130° C. and about 160° C., and can generally be carried out according to any method as is generally known in the art.

For instance, according to the embodiment illustrated in FIG. 1, prior to the reaction stage, the mixture can be dried and then subjected to a color sorting operation. Utilization of a color sorting operation prior to the reaction stage of the process has been found beneficial in certain embodiments of the present invention as the operation can essentially function as another cleaning step in the process, removing various contaminants from the mixture and thus 'cleaning' the mixture prior to the reaction stage. Contaminants that can be removed from the mixture prior to the reaction stage via a color sorting operation can include, for example, metals and colored polymeric components such as polyester materials colored with titanium dioxide.

In general, colored polyester materials, and in particular, white polyester materials colored with titanium dioxide cannot be efficiently recycled, as they are considered contaminants of the desired clear product stream. As such, it is beneficial to remove such materials from the recycle stream. In the past this has proven difficult, however, as during the recycle process itself, the clear polyester feed materials can be crystallized and appear white, and therefore difficult to separate from white contaminants such as the polyester/$TiO_2$ materials. According to the presently disclosed process, such materials can be separated from the stream prior to the reaction stage, and thus, prior to the possible crystallization of the recyclable polyesters.

In general, any color sorting technique as is generally known in the art can be utilized in the disclosed invention. For example, visual inspection or automated optical sorting and separation techniques can be used. Examples of commercially available optical color sorting equipment can include those produced by manufacturers such as SRC, Satake, and MSS.

Other separation operations that can be utilized in the present invention, for instance during the preparation stage of the process to remove as many contaminants as possible prior to the reaction stage, can include, for example, aqueous separation processes such as additional elutriation processes, additional washing operations, additional screening processes, and/or the utilization of operations specifically designed for the removal of metals from the stream.

Metal removal processes suitable for use in the present invention can include the use of magnetic separators, such as drum magnets, waterfall style magnets, eddy-current machines, or any other suitable magnetic metal detectors and separators such as those available from Bunting Magnetics, Co. of Newton, Kans. or S&S Recycling GmbH of Germany. Such devices can utilize any type of magnet (e.g., permanent ferrous magnets, rare earth magnets, electromagnets) in any suitable design so as to remove at least a portion of metallic contaminants contained in the mixture.

Reaction Stage

During the reaction stage of the disclosed process, a portion of the polyester in the mixture can be saponified through reaction of the polyester with an alkaline compound. More particularly, the reaction stage of the process can include one or more mixers, at least one of which can be a high-energy mixer. In addition, the reaction stage can optionally include additional reaction operations, such as a high temperature heat setting operation.

For instance, and according to the embodiment illustrated in FIG. 1, the reaction stage of the process can include a first low-energy mixing operation, in which the mixture containing polyester and contaminants can be combined with an alkaline composition prior to being fed to a high-energy mixing operation, in which a portion of the polyester can be saponified. Following the high energy mixing operation, the mixture can be dried and fed to a heat setting operation, for example utilizing a kiln, in which, among other benefits, the saponification reaction can be completed, if necessary. In addition, during the heat setting operation, secondary materials can be further reacted with the alkaline composition and the physical properties of the polyester can be preserved and/or enhanced.

The reaction stage of the process can optionally include one or more processes for the recovery of reaction byproducts. For example, upon saponification of PET, the reacted polyester material can be converted into a metal terephthalate and ethylene glycol. If desired, the metal terephthalate that is thus produced can be dissolved in water and the water can be acidified, causing terephthalic acid to precipitate. The terephthalic acid can be filtered and recovered as a byproduct of the disclosed process, if desired. Similarly, the polyol that is formed during the reaction process can either remain as a liquid within the mixture for later removal, or can be directly evaporated if the reaction occurs at conditions that facilitate the evaporation of the polyol. The polyol can then be recovered, if desired, for instance by use of a condenser.

The alkaline compound selected for mixing with the materials can be, in one preferred embodiment, sodium hydroxide, known commonly as caustic soda. Other metal hydroxides and alkalines can optionally be used in addition to or instead of sodium hydroxide, however. For example, suitable compounds can include calcium hydroxide, magnesium hydroxide, potassium hydroxide, lithium hydroxide or mixtures thereof. When used in solution, the metal hydroxide can be combined with water prior to mixing with the materials containing the polyester. For instance, in one embodiment, the metal hydroxide can be mixed with water in about a 1 to 1 ratio.

In general, the reaction stage of the present invention includes a high-energy mixing step during which the mixture containing contaminants and polyester can be combined with a selected amount of an alkaline solution to form a slurry. The amount of the alkaline composition added to the materials containing the polyester will generally depend upon the type and amount of impurities and contaminants present within the materials. Generally, the alkaline composition should be added only in an amount sufficient to separate the impurities from the polyester, so as to minimize the saponification of the polyester. In most applications, the alkaline composition can be added to the materials in a stoichiometric amount sufficient to react with up to about 50% of the polyester. Preferably, the alkaline composition is added in an amount sufficient to react with less than 10% of the polyester and most preferably around 3% of the polyester.

In the embodiment illustrated in FIG. 1, the slurry can be formed in a first low-energy mixer, but this is not a requirement of the invention. In other embodiments, the slurry can be formed directly in the high-energy mixer, and the low-energy mixer may not be included. Optionally, a surfactant or wetting agent may be added to the mixture and the alkaline composition when forming the slurry. Addition of a surfactant can facilitate the mixing of the alkaline composition with the materials, reducing the amount of the alkaline composition that needs to be added. The surfactant should be alkaline stable and can be nonionic or anionic in character. An example of a suitable surfactant is ETHAL TDA-3, a nonionic surfactant marketed by Ethox, Inc. of Greenville, S.C.

In those embodiments wherein one or more low-energy mixers are utilized for formation of the slurry, certain low-energy reactions can also take place in the mixer. For example, when utilizing a low-energy mixing operation, the mixer can optionally be utilized at operation parameters (for example, with the addition of a small amount of thermal energy, via heating of the mixer) so as to encourage reaction of the alkaline composition with certain contaminants found in the mixture, and in one particular embodiment, with aluminum. However, in those embodiments wherein additional energy is added to the mixture in the low-energy mixer so as to promote reaction between contaminants and the alkaline composition, the total amount of energy added to the mixture at this point in the process should not be great enough to promote any saponification reaction between the polyester and the alkaline composition. For example, in one embodiment, the low-energy mixer can be operated at an internal temperature of between about 90° C. and about 110° C. so as to encourage reaction between any aluminum contained in the mixture and the alkaline composition without promoting a saponification reaction between the polyester contained in the mixture and the alkaline composition.

It has been found that at low-energy conditions, such as those that can be encouraged in a low-energy mixer, the alkaline composition can react with aluminum in the mixture to form, for example, an alkali aluminum salt that can be dissolved in the water of the slurry. Thus, in certain embodiments of the present invention, a low-energy mixer can be utilized prior to any saponification of the polyester contained in the mixture to form a slurry and efficiently coat the solids of the mixture with the alkaline composition as well as to promote reaction of the alkaline composition with various contaminants contained in the mixture.

Optionally, a rinsing or washing operation can be included in the process following the low-energy mixer, for instance to remove any reaction products formed in the low-energy mixer. For example, in those embodiments wherein aluminum is reacted with the alkaline composition in the low-energy mixer to form an alkali aluminum salt, the mixture can be rinsed to remove at least a portion of the salt prior to additional operations in the reaction stage of the process.

Following any optional low-energy mixing operation, the materials can be fed to one or more high-energy mixers. As previously mentioned, in those embodiments not utilizing a low-energy mixer for formation of the slurry, the slurry can be formed in the high-energy mixer itself. Moreover, alkaline composition can be added to the mixture in the high energy mixer, not only in those embodiments when the slurry is formed in the high energy mixer, but also when the alkaline-containing slurry has been rinsed to remove contaminants prior to flow into the high energy mixer or to replace alkaline composition that has reacted with contaminants in the low-energy mixer, whether rinsing has occurred or not.

The high energy mixer utilized is one that can not only provide substantially complete and even coating of the polyester materials by the alkaline composition, when desired, but also can impart sufficient energy to cause a portion of the polyester to saponify, or, in other words, to hydrolyze, without the necessity of the addition of large amounts (or in certain embodiments, any) heat to the mixer. For example, mixers such as those described in U.S. Pat. No. 4,320,979 to Lucke and U.S. Pat. No. 4,189,242 to Luke, which are herein incorporated in their entirety by reference thereto, may be employed in the high-energy mixing operation to promote saponification of at least a portion of the polyester with the alkaline solution.

In one embodiment of the present invention, a high-energy mixer can be operated at a Froude number greater than about 4.2, particularly greater than 6.6, and more particularly greater that about 9.5. Specifically, at the above rates, the mixer of the present invention not only mixes the slurry but also imparts sufficient energy to the slurry to cause the alkaline composition to react with the polyester. In one embodiment, high energy mixing can be continued until substantially all of the alkaline composition has been exhausted. For example, the high-energy mixer can be operated such that residual (unreacted) metal hydroxide exiting the mixer can be less than about 1% by weight of the slurry. Specifically, residual metal hydroxide exiting the mixer can be less than about 0.5% by weight. More specifically, residual metal hydroxide can be less than about 0.1% by weight of the slurry, for instance less than about 0.05% by weight.

During saponification, various coatings that may be adhered to the polyester and/or other contaminants which may be entrained within the surface of the polyester can be released from the polyester. The energy provided from the action of the mixer can also promote reaction between the alkaline solution and other contaminants that can be found in the slurry, such as polyvinyl chloride or aluminum, for example. Upon reaction of these types of materials with the alkaline composition, the impurities can be converted to another form, one which is more easily separable from the polyester substrate.

In addition, it is also believed that due to the completeness of mixing as well as the substantially even coating of alkaline supplied to the polyester materials in the high energy mixer, the salt reaction product can form a coating on the polyester materials which exit the mixer. For example, if the outer surface of a PET flake is saponified in the high-energy mixer with a sodium hydroxide composition, it is believed that the disodium terephthalate reaction product can coat the remaining PET. Moreover, it is believed that this coating formed around a polyester piece can serve to protect the polyester during later processing operations. For example, the salt coating can protect the polyester from oxidation due to high temperature conditions encountered later in the heat setting operation. Among other benefits, this can provide a polyester product with less discoloration than that obtained in the past.

In certain embodiments, following reaction in one or more high-energy mixers the mixture can be dried and proceed to the finishing stage or optionally proceed directly from a high-energy mixer to the finishing stage. In particular, in those embodiments wherein the recycled polyester product obtained from the process is not intended as food-grade product, additional reaction operations, and in particular, the heat setting operation discussed below, may not be necessary. In those embodiments wherein food-grade product is desired, however, the process can include at least one heat setting operation.

Following the reaction within the high-energy mixer, the slurry can then be dried and, in certain embodiments, fed to a heat setting operation. For example, the mixture can first be dried by heating the mixture to a temperature of between about 150° C. and about 160° C., followed by additional heating, after drying, to a heat setting temperature that can encourage additional reaction of the materials. The actual temperature to which the mixture is heated during the heat setting operation can depend upon a number of factors. In general, the mixture should be heated to as high a temperature as possible without melting the polyester. For instance, PET has a melting point typically between 250° C. to about 270° C. Consequently, when substantial amounts of PET are contained within the materials, the mixture should be heated to a temperature below about 270° C. during the heat setting operation. In most applications, the temperature can be within a range of from about 100° C. to about 270° C.

In general, the heat setting operation can be carried out in an environment that is at least substantially free of water, for example, in a dry air environment. However, though a dry air environment can be preferred in some embodiments, due to, for example, cost considerations, an inert atmosphere such as nitrogen, argon, carbon dioxide, or the like can also be effectively employed, such as in the form of a nitrogen blanket. If desired, the mixture can also be heated at reduced pressures, which correspond to lower oxygen levels. By the term "at least substantially free" it is meant that the amount of water present in the environment is less than that which results in degradation of the polyester during heating. This amount is typically not more than 80 ppm (−40° F. Dew Pt.), preferably not more than about 10 ppm, still more preferably not more than about 5 ppm (−80° F. Dew Pt.). There is no theoretical minimum as the amount of water can be as low as 1 ppm of the environment or even less.

Also, in one embodiment, the mixture can preferably be heated in an oxygen-starved environment. As used herein, oxygen-starved refers to an environment in which oxygen is present below about 19% by volume. In combination with the dry atmosphere, maintaining lower oxygen levels during the heat setting phase can further prevent the polyester from being substantially degraded or discolored and also can further prevent against uncontrolled combustion. If desired, the mixture can also be heated at reduced pressures, which correspond to lower oxygen levels. In addition, during heating, the slurry can generally be heated indirectly such that it does not contact an open flame.

An oxygen-starved environment is not a requirement of the invention, however, and in other embodiments, it may be preferable to heat the mixture in an oxygen-rich environment, i.e., an environment including oxygen at greater than about 19% by volume.

The equipment and apparatus used during the heat setting operation of the present invention can vary. For example, in one embodiment the heat setting operation can be carried out in a rotary kiln. The rotary kiln can be heated by an electrical element, by heated oil or by fossil fuel burners. One example of a suitable indirectly heated kiln for use in the process of the present invention is the Rotary Calciner marketed by the Renneburg Division of Heyl & Patterson, Inc. In other embodiments, however, a multi-disc thermal processor or an oven can optionally be employed. Of course, many other similar devices, for example, infrared heat processors, microwave heaters, and the like are available that may optionally be utilized in the processes of the present invention.

In one embodiment, the kiln can first be heated to a lower temperature for a desired period of time to dry the materials from the high-energy mixer and then the temperature can be increased to the higher level. Alternatively, the slurry exiting the high-energy mixer can first be heated in a dryer, such as, for example, a ConAir dryer, before being transferred to a kiln for the higher temperature heat setting step. In yet another embodiment, a kiln can be utilized for relatively rapid temperature increase of the mixture to the desired level, and the hot materials can then be transferred to a larger column dryer or any other suitable solid stating system, where they can be maintained at the desired temperature for the desired period of time.

The heat setting operation of the disclosed process can provide many beneficial functions. For example, during the heat setting operation, by-products such as ethylene glycol formed during the saponification reaction in high energy mixing either the high-energy mixer or in the heat setting operation can be evaporated off of the stream. The evaporated materials can then be collected, for instance in a condenser, and sent to a suitable treatment operation, for instance a water treatment operation for recovery, if desired. In addition, during the heat setting operation any remaining unreacted alkaline that has been carried over from the high energy mixing operation can be reacted with either polyester or other reactive contaminants found in the mixture.

Remaining entrained organic and/or inorganic compounds that may be absorbed into polyester can be removed from the product polymer during the heat setting process. Specifically, any remaining volatile organic and inorganic compounds can be substantially removed during the heat setting step not only from the polyester, but also, and depending upon the nature of the compound, from the stream altogether via the off-gases. By ensuring removal of substantially all of any entrained organic and inorganic compounds, "food grade" polyester can be recovered which can be used in an unrestricted manner. In addition, heating the mixture can cause loose, dried impurities to be degraded into a more easily separable form in order to facilitate final separation of the impurities from the polyester product.

The heat setting operation can also improve the physical characteristics of the polyester in the mixture. In particular, the heat setting operation is believed to increase the clarity and the intrinsic viscosity of the product polyester materials. To this end, the heating step in the presence of a dry atmosphere can be performed for a period of time sufficient to enhance the intrinsic viscosity of the polyester. For example, according to one embodiment of the presently disclosed process, the intrinsic viscosity of a polyester in the feed can increase from about 0.76 dL/g to about 0.82 dL/g. For instance, the intrinsic viscosity of the feed materials can be increased by between about 5% and about 10% according to one embodiment of the presently disclosed invention. A minimum time is dependent on, e.g., the water content of the environment and can be as low as 5–10 minutes.

Once physically separated from the polyester, contaminants such as the now detached coatings materials and/or entrained materials can be further degraded while the materials are processed in subsequent operations. For instance, solvents and liquids contained within the coatings or removed from the polyester during the heat setting operation can be volatilized and optionally removed from the kiln and recaptured in a condenser similar to the method for recapturing the ethylene glycol product from the saponification reaction described above. Left behind in the mixture can be some relatively smaller sized impurities. When the mixture is later subjected to additional separation operations, for instance in the finishing stage of the process, remaining insoluble impurities can be separated from the larger polyester chips, for instance using an appropriately sized screen that allows passage of the impurities while preventing passage of the polyester.

During the reaction stage of the process, in addition to saponifying a portion of the polyester, certain hard-to-separate contaminants commonly found with post-consumer polyester can be converted into a form that can be more easily separated from the mixture. In particular, during the reaction stage of the process contaminants such as polyvinyl chloride, polylactic acid (PLA), and aluminum can be converted into forms that can be more easily separated from polyester.

When polyvinyl chloride and/or polylactic acid are present within the materials, the materials can be converted into a form that is more easily separable from the mixture. For example, according to one embodiment, at least a portion of the PVC can be converted to a form that is darker and thus separable from the mixture via color sorting techniques. In some embodiments, the PVC contaminants can be converted to a form that floats in water. In other embodiments, the PVC can be reacted to a form that exhibits increased heat resistance. Moreover, combinations of these characteristics can be exhibited by the reacted PVC. In general, the specific reactions of the PVC with the alkaline composition can depend upon the particular characteristics of the PVC contaminants contained in the mixture. However, no matter what the particular starting characteristics of the contaminant PVC, it is believed that upon combination of the mixture with the alkaline composition and addition of suitable energy, the PVC can react to form more easily separable from the polyester contained in the mixture. Consequently, when polyvinyl chloride is present in the materials, it may be preferable to add enough alkaline composition to the slurry sufficient to react with the polyvinyl chloride or, in other words, to convert the polyvinyl chloride into a form separable from the polyester.

However, if not reacted with the alkaline composition in the high energy mixer and/or during heat setting, the PVC can optionally be removed from the mixture by heating the mixture to a temperature that is greater than the melting temperature of PVC but less than the melting temperature of the polyester contained in the mixture, upon which the PVC can melt and then be removed from the mixture, for instance by use of a sieve or other suitable separation technique during either the reaction stage or optionally during the finishing stage of the process.

PLA can be removed from the mixture according to similar processes as that described above for PVC. In particular, any variations in the process, for example, variations in amount of alkaline composition, variation in processing conditions (e.g., temperatures, etc.) that may be different from those described above for PVC are well within the general knowledge of one of ordinary skill in the art, and thus will not be described in detail herein.

Besides polyvinyl chloride, polyester collected from the solid waste stream can also typically be mixed with pieces of aluminum, as mentioned above. The aluminum can originate, for instance, from bottle caps utilized with polyester beverage containers or from the imperfect separation of plastic and aluminum cans found in post-consumer waste. Aluminum, similar to polyvinyl chloride, cannot easily be separated from polyester using standard separation processes such as a sink/float separation operation.

When contacted with an alkaline composition and provided with suitable energy within any or all of the low-energy mixer, the high-energy mixer and/or the heat setting operation, aluminum can be converted to an alkali aluminum salt, which is typically water soluble. Thus, in one embodiment, an amount of alkaline composition can be added to the materials containing polyester and aluminum sufficient to completely convert the aluminum to an aluminum salt. Following the reaction, a fluid, such as water, can then be added to the mixture to dissolve the aluminum salt and separate it from the polyester.

According to one embodiment of the present invention, not all of the aluminum contained in the stream entering the reaction stage need be converted into an aluminum salt. Instead, only a portion of the aluminum can be converted to the aluminum salt with the alkaline composition. In particular, it has been discovered that following the reaction of a portion of the aluminum with the alkaline composition, the remaining aluminum pieces can become brittle. According to this embodiment, the materials containing the polyester mixed with the remaining aluminum can then be agitated under shear conditions and the remaining brittle aluminum can be broken into small pieces. The small pieces can then be separated from the polyester for instance with a suitable separation operation, for instance, a simple screening process utilizing a screen having a size sufficient to capture the larger polyester chips while allowing the smaller broken aluminum pieces to pass.

Accordingly, when aluminum is present within the materials containing the polyester, the alkaline composition can be added to the materials in an amount sufficient to react with at least a portion of the aluminum, sufficient that the remaining aluminum will be brittle. Of course, the actual amount of alkaline composition added can depend not only upon the quantity of aluminum present in the materials, but also upon the size (e.g., thickness) of the aluminum pieces.

Additional operations that can be included in the reaction stage can include, for example, additional heating operations, for instance holding the mixture at a suitable temperature for a period of time to further increase the intrinsic viscosity of the product polyester. For example, following a heat setting operation at high temperature, for instance in a kiln, the mixture can be held in one or more ovens for a period of time at a desired temperature to ensure the production of food-grade polyester, to further improve the physical characteristics of the product, to remove additional volatile contaminants, and/or to remove additional nonvolatile contaminants, such as paper fibers, for example, via heat convection and/or radiant heat in the oven. Any suitable oven can be used in such an embodiment, including infrared type ovens.

Finishing Stage

Particular operations included in the finishing stage of the disclosed process can generally vary depending on the particular contaminants and/or impurities in the starting compositions. In addition, and depending upon the particular impurities found in the starting material, the invention can not only effectively recover polyester from a variety of contaminants and/or impurities, but can also recover particular contaminants found in the waste stream as by-products of the process. For example, polyolefins removed from the stream at a sink/float operation can be dried and recovered.

In one embodiment, the finishing stage of the process can at the very least include at least one washing or rinsing operation, one color sorting operation, for removal of discolored contaminants from the mixture, and at least one elutriation operation, for the removal of fines and any remaining light contaminants from the product.

Optionally, rather than or in addition to simply washing the materials with water, the materials can be washed with a cleaning solution. For instance, the mixture containing the polyester and any remaining contaminants can be mixed with a hot aqueous solution containing a surfactant or with a hot aqueous solution containing an alkaline material and washed. If desired, the mixture can be heated under agitation or in a high intensity wash, such as that described above during the preparation stage. Washing the materials can clean the polyester by straight separation of the polyester from the contaminants and can also dissolve and/or break apart some of the contaminants.

During the finishing stage, the acid salt or metal salt formed during the saponification reaction can dissolve in the wash water. If desired, the metal salt can be later recovered from the wash water for disposal or as a by-product of the process. For instance, if the acid salt is a terephthalate, the wash water can first be filtered in order to remove any undissolved impurities and contaminants. Next, the wash water can be acidified causing terephthalic acid to precipitate. In order to acidify the solution, a mineral acid such as hydrochloric acid, phosphoric acid or sulfuric acid or an organic acid such as acetic acid or carbonic acid can be added to the solution. Once the terephthalic acid precipitates, the terephthalic acid can be filtered, washed and dried, leaving a relatively pure product.

In order to separate certain contaminants, such as certain polyvinyl chloride reaction products, from the polyester, the mixture can be combined with a fluid such as water during the finishing stage. When placed in water, the polyester will sink while the dechlorinated polyvinyl chloride can float. In addition, it has been found that treating polyvinyl chloride with an alkaline composition in the above-described manner can promote the adhesion of entrained air and other gas bubbles to the surface of the polyvinyl chloride reaction product, making the polyvinyl chloride reaction product even more buoyant. Consequently, when the mixture is in liquid (e.g., water) gas bubbles, such as air bubbles, may be forced through the liquid to increase separation efficiency. Of course, other separation techniques based on the differences in density between the polyester and the dechlorinated polyvinyl chloride may optionally be incorporated into the process.

As described above, the reaction of PVC with the alkaline composition can also darken the color of the polyvinyl chloride and increase its melting point. Consequently, in another embodiment, the polyvinyl chloride reaction product can be separated from the polyester during the finishing stage via a color sorting operation, such as that described above in the preparation stage. Other contaminants can be separated from the mixture via a color sorting operation during the finishing stage as well. For example, in certain embodiments, the polyester feed product can include certain barrier materials, such as acetaldehyde scavenger barrier materials in either the reacted or unreacted form. According to the present invention, such contaminants can become discolored during the presently disclosed process, for instance during the heat setting operations of the present invention. Upon a color sorting operation during the finishing stage, such contaminants, and in particular, those that can alter in color during the reaction stage of the process, can be removed from the mixture.

In one embodiment, the finishing stage can include neutralization of any remaining alkaline material through the addition of a suitable acid to the mixture such as an inorganic acid including, for example, hydrochloric acid, phosphoric acid and/or sulfuric acid or an organic acid such as acetic acid and/or carbonic acid. Following neutralization of any remaining base through addition of an acid solution, the mixture can be dried prior to any dry separation operations.

Figure 2:
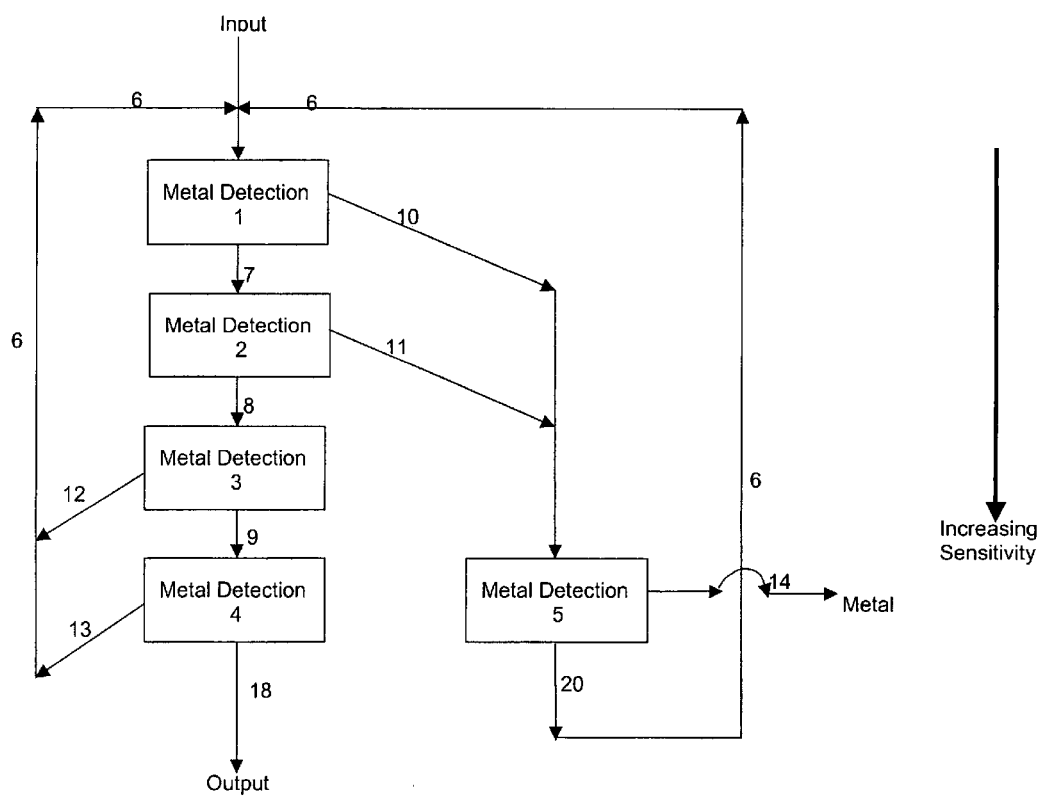
FIG. 2 illustrating a flow diagram of one embodiment of a multi-step, high quality metal removal system according to the present invention.

During the finishing stage, remaining metal contaminants can be removed from the mixture in a metal removal operation. One embodiment of a high quality metal removal operation suitable for use in the present invention is illustrated in FIG. 2. As can be seen with reference to FIG. 2, according to this particular embodiment, a metal removal operation can include multiple metal detectors in series and parallel combination to form a bank of individual metal removal devices so as to provide more complete removal of metal contaminants than obtained in metal separating operations known in the past.

It should be understood that though this particular metal separation operation is presented herein as an operation taking place during the finishing stage of the disclosed process, an equivalent operation could optionally be included elsewhere in the process, for instance during the preparation stage. In addition, multiple high quality metal removal operations as herein described can be included in a polyester recovery process at various suitable locations throughout the process.

In one embodiment, the process can include multiple banks of two or more metal removal devices in a single operation step. According to this embodiment, the total mixture stream can be split among two or more banks of metal removal devices, so as to create multiple smaller input streams to each bank of devices. For example, a single operative step in a polyester recovery process can include one, two, or even more banks of devices. For instance, the high quality metal removal operation can include anywhere from 1 to 10, 20, 30, or even more banks each containing two or more individual metal detection and removal devices.

Referring to FIG. 2, a single bank of devices according to one embodiment of the invention is illustrated. As can be seen, according to this particular embodiment, the bank includes five individual metal detection and removal devices, but it should be understood that this particular number is not a requirement of the invention. In other embodiments, the bank of devices can include additional or optionally fewer individual devices. For instance, the bank of devices can include as few as two devices and no limit to the upper number of individual devices included in the bank. Though practically speaking, economic considerations can generally be involved in determining the preferred number of individual devices included in a bank as well as the total number of banks included in an operative step of the process.

The entire input stream fed to the bank is treated in a first metal detection unit 1. Upon detection of metal in the input stream, a portion of the stream including the detected metal is separated and removed from the stream, as rejected stream 10. The 'clean' or accepted stream 7 and the rejected stream 10 taken off of metal detection unit 1 then proceed to additional metal detection units 2, 5, respectively. At metal detection unit 2, the detection and separation process is repeated, with the rejected stream 11 (which includes detected metal) being fed to metal detection unit 5, and the accepted stream 8 being fed to yet another detector and separation unit 3, and then on to final metal detection unit 4. The rejected streams 12, 13 from metal detection units 3 and 4 are each fed to the recycle stream 6, and the final accepted stream 18 continues on in the overall process. At metal detection and removal unit 5, the accepted stream 20 is fed back to recycle stream 6, and the rejected stream 14 is removed from the process as waste material containing metal.

In addition to recycling the rejected streams 10, 11, 12, 13, and accepted stream 20 back through the process via recycle stream 6, the individual metal detectors contained in the bank can be set at increasing sensitivity as the stream proceeds through the process, as shown by the side arrow. For example, metal detection units 2, 3 and 4 can have increasing sensitivity as compared to each other as well as compared to metal detection unit 1. Moreover, the sensitivity of metal detection unit 5 can be greater than that of metal detection unit 1.

Through the process of the present invention including the high quality metal removal operation, essentially all metal contained in the input stream of the process can be removed from the polyester product stream.

In general, the finishing stage of the operation can also include one or more elutriation operations for the removal of any remaining light contaminants such as any remaining paper or paper fibers or any polymer fines.

Other separation operations that can be utilized in the finishing stage as well as between operations in the preparation and/or reaction stage can include physical separation operations such as those described above in regard to the preparation stage as well as any other suitable separation operations as are generally known in the art such as, for instance, the use of one or more destoning operations for the removal of glass, and/or the use of hydrocyclones. For example, in one embodiment, a double hydrocyclone embodiment can be utilized in which the materials can be pumped to a first hydrocyclone to remove high-density contaminants, such as glass and/or metal, and then sent to a second tank and pumped to a second hydrocyclone to remove lower-density contaminants, such as paper and/or polyolefins, for example.

One or more vibratory screening methods can also be utilized at various locations throughout the disclosed process to, for example, separate contaminant materials taken off of the top of the sink/float tank from the processing water, for removal of contaminants in powdered form following the heat setting operation, following a high shear washing operation in the preparation and/or finishing stage or following a final washing and drying operation in the finishing stage.

In one embodiment, heavy contaminants can be removed from the mixture at any suitable point in the process by use of a sluice operation. For example, immediately before or after any aqueous separation operations in the preparation stage or immediately before or after any aqueous separation operations in the finishing stage, it may be beneficial in certain embodiments of the process to include a sluice operation for the removal of certain heavy contaminants from the mixture.

The treatment method of the disclosed invention is capable of providing a number of significant advantages. For example, it is capable of cleaning and/or decontaminating polyester. In fact, the polyester can be cleaned and/or decontaminated to a level which is sufficient to meet various regulatory guidelines, and in particular, can produce food-grade polyester product. Of course, it should be recognized that the target level of cleaning or decontamination can depend upon the ultimate end use of the polyester. In particular, the process is capable of providing a recycled polyester product having improved properties, e.g., a high degree of cleanliness, good color and even an improved intrinsic viscosity. Moreover, the disclosed process is capable of providing these products at an acceptable yield and at a lower processing cost since, e.g., it does not require "re-polymerization" of the monomers in contrast to typical depolymerization processes.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for separating contaminants from polyester comprising:
   providing a mixture comprising contaminants and polyester;
   removing a portion of the contaminants from the mixture in an elutriation operation, wherein contaminants heavier than the polyester are removed from the mixture during the elutriation operation;
   combining the mixture with an alkaline composition; and
   saponifying only a portion of the polyester according to a saponification reaction between the alkaline composition and the polyester.

2. The method according to claim 1, wherein the alkaline composition is an aqueous composition, the mixture being combined with the alkaline composition to form a slurry.

3. The method according to claim 2, further comprising mixing the slurry in a high energy mixer, wherein said mixing imparts sufficient energy to said slurry so as to promote the saponification reaction between the polyester and the alkaline composition and wherein the saponification takes place in the high energy mixer according to the saponification reaction, wherein any heat added to the slurry in the high energy mixer is not sufficient to independently promote the saponification reaction of the polyester with the alkaline composition.

4. The method according to claim 1, further comprising heating the mixture to a temperature that is not greater than the melting point of the polyester in a heat setting operation, wherein the mixture is heated in an environment including less than about 80 ppm water content.

5. A method for separating contaminants from polyester comprising:
  providing a mixture comprising contaminants and polyester wherein the contaminants comprise aluminum;
  combining the mixture with an alkaline composition in a low-energy mixer to form a slurry;
  reacting the alkaline composition with at least a portion of the aluminum while the mixture is in the low-energy mixer;
  mixing the slurry in a high energy mixer, wherein said high-energy mixing imparts sufficient energy to said slurry so as to promote a saponification reaction between the polyester and the alkaline composition; and
  saponifying only a portion of the polyester in the high-energy mixer according to the saponification reaction, wherein any heat added to the slurry in the high-energy mixer is not sufficient to independently promote the saponification reaction of the polyester with the alkaline composition.

6. The method according to claim 5, further comprising heating the mixture to a temperature that is not greater than the melting point of the polyester in a heat setting operation, wherein the mixture is heated in an environment including less than about 80 ppm water content.

7. The method according to claim 5, the method further comprising rinsing the slurry following reaction of at least a portion of the aluminum and adding additional alkaline composition to the slurry prior to the saponification reaction in the high-energy mixer.

8. A method for separating contaminants from polyester comprising:
  providing a mixture comprising contaminants and polyester, wherein the contaminants comprise metal;
  removing at least a portion of the metal contaminants from the mixture in at least one metal detection and removal operation wherein the at least one metal detection and removal operation comprises at least one bank of metal detectors, each bank comprising two or more metal detectors in series combination, parallel combination, or a combination of both;
  combining the mixture with an alkaline composition; and
  saponifying only a portion of the polyester according to a saponification reaction between the alkaline composition and the polyester.

9. The method according to claim 8, wherein the alkaline composition is an aqueous composition, the mixture being combined with the alkaline composition to form a slurry.

10. The method according to claim 9, further comprising mixing the slurry in a high energy mixer, wherein said mixing imparts sufficient energy to said slurry so as to promote the saponification reaction between the polyester and the alkaline composition and wherein the saponification takes place in the high energy mixer according to the saponification reaction, wherein any heat added to the slurry in the high energy mixer is not sufficient to independently promote the saponification reaction of the polyester with the alkaline composition.

11. The method according to claim 8, further comprising heating the mixture to a temperature that is not greater than the melting point of the polyester.

12. The method according to claim 8, wherein the at least one metal detection and removal operation comprises formation at each metal detector of an accepted stream and a rejected stream, the method further comprising recycling at least one rejected stream through the metal detection and removal operation.

13. The method according to claim 8, wherein the at least one bank of metal detectors comprises at least two metal detectors in series, wherein the metal detectors in series exhibit increasing sensitivity to metal with progression of the series.

14. The method of claim 1, wherein the elutriation operation includes a fluid flow rate of between about 1.02 cfm per pound of mixture fed to the elutriation operation per hour and about 1.84 cfm per pound of mixture fed to the elutriation operation per hour.

* * * * *